(12) United States Patent
Meynard et al.

(10) Patent No.: US 6,879,503 B2
(45) Date of Patent: Apr. 12, 2005

(54) CUTTING ELECTRIC POWER CONVERTER

(75) Inventors: Thierry Meynard, L'Union (FR); Elie Lefeuvre, Millau (FR)

(73) Assignees: Centre National de la Recherche Scientifique (C.N.R.S.), Paris (FR); C.I.R.T.E.M., Labege Cedex (FR); Institut National Polytechnique de Toulouse, Tolouse Cedex 4 (FR)

( * ) Notice: Subject to any disclaimer, the term of this patent is extended or adjusted under 35 U.S.C. 154(b) by 72 days.

(21) Appl. No.: 10/380,289

(22) PCT Filed: Sep. 10, 2001

(86) PCT No.: PCT/FR01/02805

§ 371 (c)(1),
(2), (4) Date: Aug. 11, 2003

(87) PCT Pub. No.: WO02/23708

PCT Pub. Date: Mar. 21, 2002

(65) Prior Publication Data

US 2004/0037101 A1 Feb. 26, 2004

(30) Foreign Application Priority Data

Sep. 12, 2000 (FR) ............................................ 00 11611

(51) Int. Cl.[7] ................................................ H02M 7/00
(52) U.S. Cl. ........................ 363/71; 363/124; 363/132
(58) Field of Search .............................. 363/71, 97, 98, 363/124, 131, 132, 135, 136

(56) References Cited

U.S. PATENT DOCUMENTS 5,737,201 A   4/1998  Meynard et al. ............... 363/60
6,480,403 B1 * 11/2002  Bijlenga ....................... 363/98
6,519,169 B1 *  2/2003  Asplund et al. ............. 363/132
6,697,271 B2 *  2/2004  Corzine ....................... 363/71

FOREIGN PATENT DOCUMENTS

GB      2 294 821        5/1996

OTHER PUBLICATIONS

P. Carrere et al., "4000V–300A Eight–Level IGBT Inverter Leg", European Conference On Power Electronics And Applications, B, Brussels, EPE Association, vol. Conf. 6, Sep. 19, 1995, pp. 1106–1111.

* cited by examiner

*Primary Examiner*—Jessica Han
(74) *Attorney, Agent, or Firm*—Young & Thompson

(57) ABSTRACT

A cutting device for reversibly converting electric power between an alternating voltage source and an alternative current source, comprises switching cells each comprising first and second switches unidirectional in voltage and bidirectional in current. A first group of switches consists of the first switches of the switching cells connected in series between a first terminal of the voltage source and a first terminal of the current source, and a second group of switches consists of the second switches of the switching cells connected in series beween a second terminal of the voltage source and the first terminal of the current source, the unidirectional characteristics in voltage of the first and second switches belonging to a first half of the cells being respectively opposed to those of the first and second switches belonging to a second half of the cells.

9 Claims, 5 Drawing Sheets

CUTTING ELECTRIC POWER CONVERTER

The present invention relates to a cutting device for reversibly converting electrical power.

More particularly, the invention relates to a cutting device for reversibly converting electrical power between a source of alternating voltage and a source of alternating current, comprising an even number of switching cells each having a first and a second switch which are unidirectional in voltage and bidirectional in current, capacitors associated with the switching cells and suitable for maintaining at the terminals of the cells a voltage having a charge which is zero or equal to a predetermined fraction of the voltage of the voltage source, and control devices each connected to a switching cell and suitable for controlling the switching of the first and second switches of the cell, a first half of the cells being suitable for processing the positive alternation of the voltage of the voltage source and the second half of the cells being suitable for processing the negative alternation of the voltage of the voltage source.

In the following, "switching cell" is understood to mean a unit constituted by two switches controlled in opposite states by control devices supplying them with an electrical control signal.

Thus, the two switches of a cell cannot be simultaneously in the blocked state. Likewise, they cannot be simultaneously in the conductive state, except when the voltages maintained respectively between their first terminals and their second terminals are equal, and especially when they are zero.

Such a conversion device is described in the article by B.-H. Kwon, B.-D. Min and J.-H. Kim, entitled "Novel topologies of AC choppers", published in IEE Proceedings on Electr. Power Appl., pages 323–330, volume 143, no. 4 of July 1996.

It comprises two switching cells each associated with a capacitor.

A first cell is suitable for processing the positive alternation of the voltage of the voltage source and is connected to only one of the two terminals of the voltage source.

The second cell is suitable for processing the negative alternation of the voltage of the voltage source and is connected only to the other of the two terminals of the voltage source.

An advantage of this structure is that it permits the use of switching cells that comprise switches that are unidirectional in voltage and bidirectional in current, the practical implementation of which is simple.

However, in this device the current source is connected, on the one hand, between the two switches of the first cell and, on the other hand, between the two switches of the second cell. The consequence of this constraint is, for example, that it is impossible to connect one of the two terminals of the current source to one of the two terminals of the voltage source or to a point of the device that has a predetermined level of potential, which may be recommended for some applications.

The invention aims to remedy the disadvantages of a conventional cutting device for reversibly converting electrical power, by creating a device enabling one of the two terminals of the current source to be connected freely to any point of the circuit, such as, for example, one of the two terminals of the voltage source.

The invention therefore relates to a cutting device for reversibly converting electrical power between an alternating voltage source and an alternating current source, comprising an even number of switching cells each having a first and a second switch which are unidirectional in voltage and bidirectional in current, capacitors associated with the switching cells and suitable for maintaining at the terminals of the cells a voltage having a charge which is zero or equal to a predetermined fraction of the voltage of the voltage source, and control devices each connected to a switching cell and suitable for controlling the switching of the first and second switches of the cell, a first half of the cells being suitable for processing the positive alternation of the voltage of the voltage source and the second half of the cells being suitable for processing the negative alternation of the voltage of the voltage source, characterised in that a first group of switches is formed by the first switches of the switching cells, which first switches are connected in series between a first terminal of the voltage source and a first terminal of the current source, in that a second group of switches is formed by the second switches of the switching cells, which second switches are connected in series between a second terminal of the voltage source and the first terminal of the current source, the unidirectional characteristics in voltage of the first and second switches belonging to the first half of the cells being respectively opposed to those of the first and second switches belonging to the second half of the cells.

Thus, a device according to the invention enables the point of connection of the second terminal of the current source to be freely selected, which may prove to be a major advantage for some applications.

The cutting device for reversibly converting electrical power according to the invention may also comprise one or more of the following features:

a second terminal of the current source is connected to either of the first and second terminals of the voltage source, thus forming a neutral point of the device common to the voltage source and to the current source;

the switches of each group belonging to the first half of the cells are connected in alternation with the switches of each respective group belonging to the second half of the cells;

the control devices are suitable for controlling the switching of the two switches of each cell of the first half of the cells, ensuring that they are in opposite states, and for keeping conductive the two switches of each cell of the second half of the cells when the voltage of the voltage source is positive, and conversely, for controlling the switching of the two switches of each cell of the second half of the cells, ensuring that they are in opposite states, and for keeping conductive the two switches of each cell of the first half of the cells when the voltage of the voltage source is negative; and all the cells of the first half of the cells, when the voltage of the voltage source is positive, and all the cells of the second half of the cells, when the voltage of the voltage source is negative, are controlled with substantially equal cyclic ratios and substantially equal phase shifts between two successive cells of a same half of the cells.

The invention relates also to a cutting device for reversibly converting polyphase electrical power between a multiplicity of voltage sources and a multiplicity of current sources, characterised in that it comprises a multiplicity of devices, the voltage sources and current sources of which are respectively connected to one another.

The cutting device for reversibly converting polyphase electrical power according to the invention may also comprise one of the following features:

the second terminals of all the current sources are connected to one another, thus forming a neutral point of the current sources, and one of the terminals of each voltage source is connected to the same point, thus forming a neutral point of the voltage sources; and the neutral point of the current sources and the neutral point of the voltage sources are connected to one another, thus forming a neutral point of the device common to all of the voltage and current sources.

The invention will be better understood with the help of the following description which is given purely by way of example and with reference to the appended drawings in which.

Figure 6:
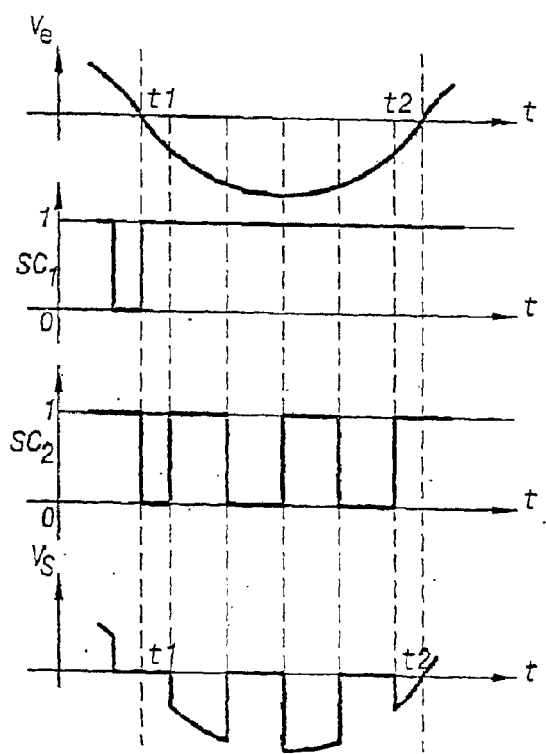
Figure 5:
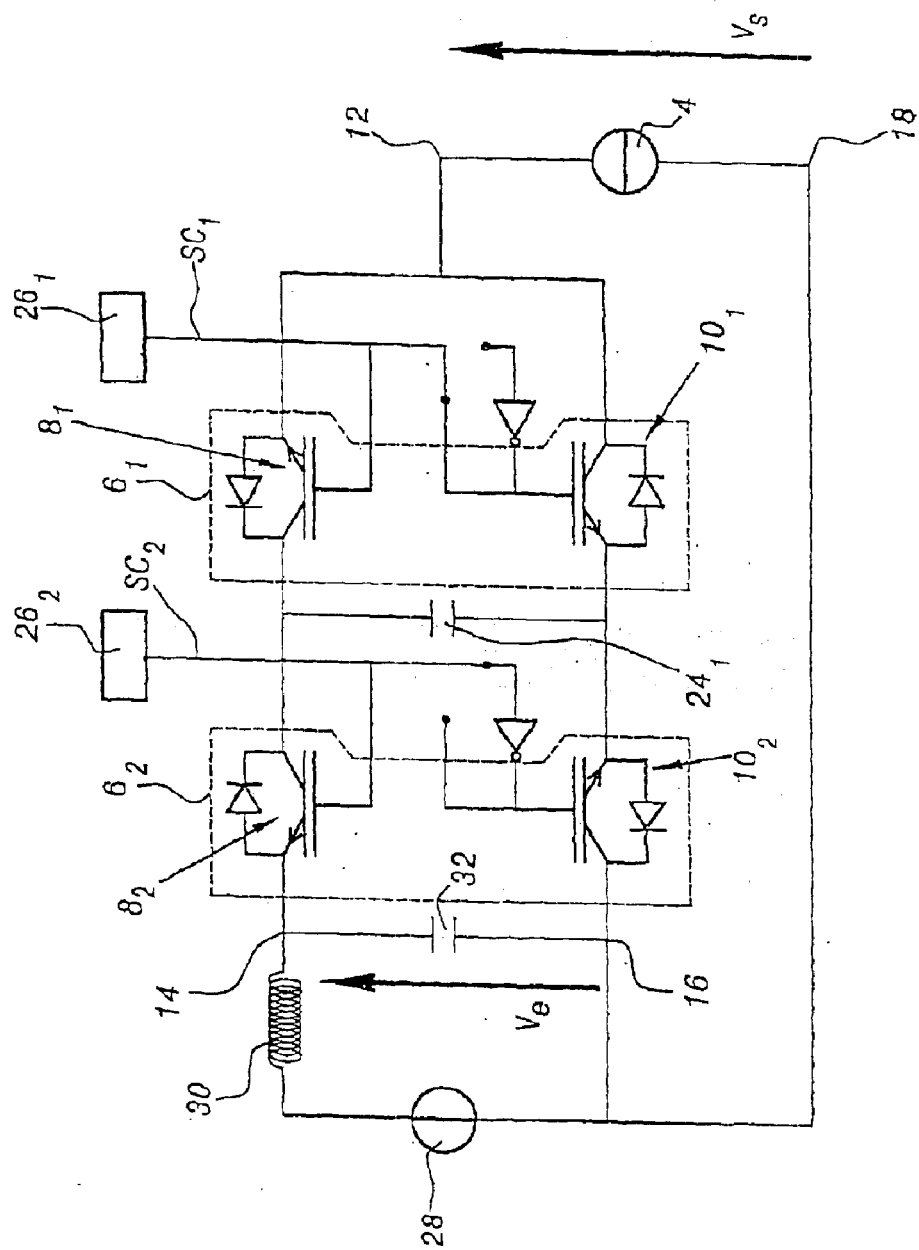
FIG. 5 is a block diagram of a device for reversibly converting electrical power according to the invention, in a case where it comprises two cells, also showing a control unit of this device, during a negative alternation of the voltage of the voltage source.
Figure 7:
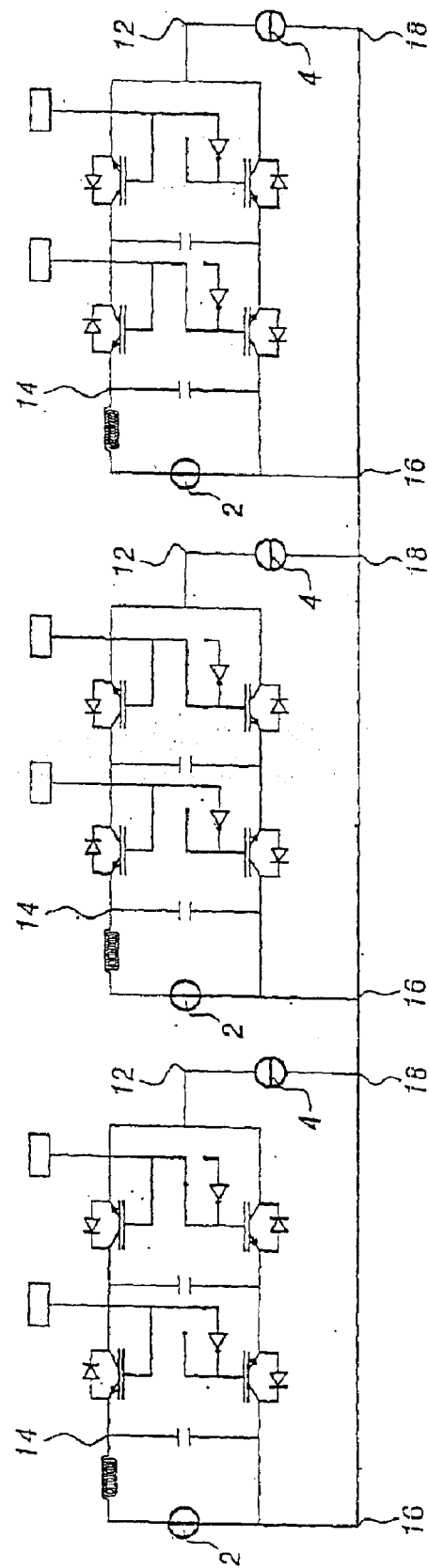

FIG. 6 shows the response curve of the voltage at the terminals of the alternating voltage source, of the control signals of the unit for controlling the switching cells and of the output voltage at the terminals of the alternating current source, for the device shown in FIG. 5; and FIG. 7 is a block diagram of a three-phase device for reversibly converting electrical power, according to a further aspect of the invention, in which the control unit is not shown.

Figure 1:
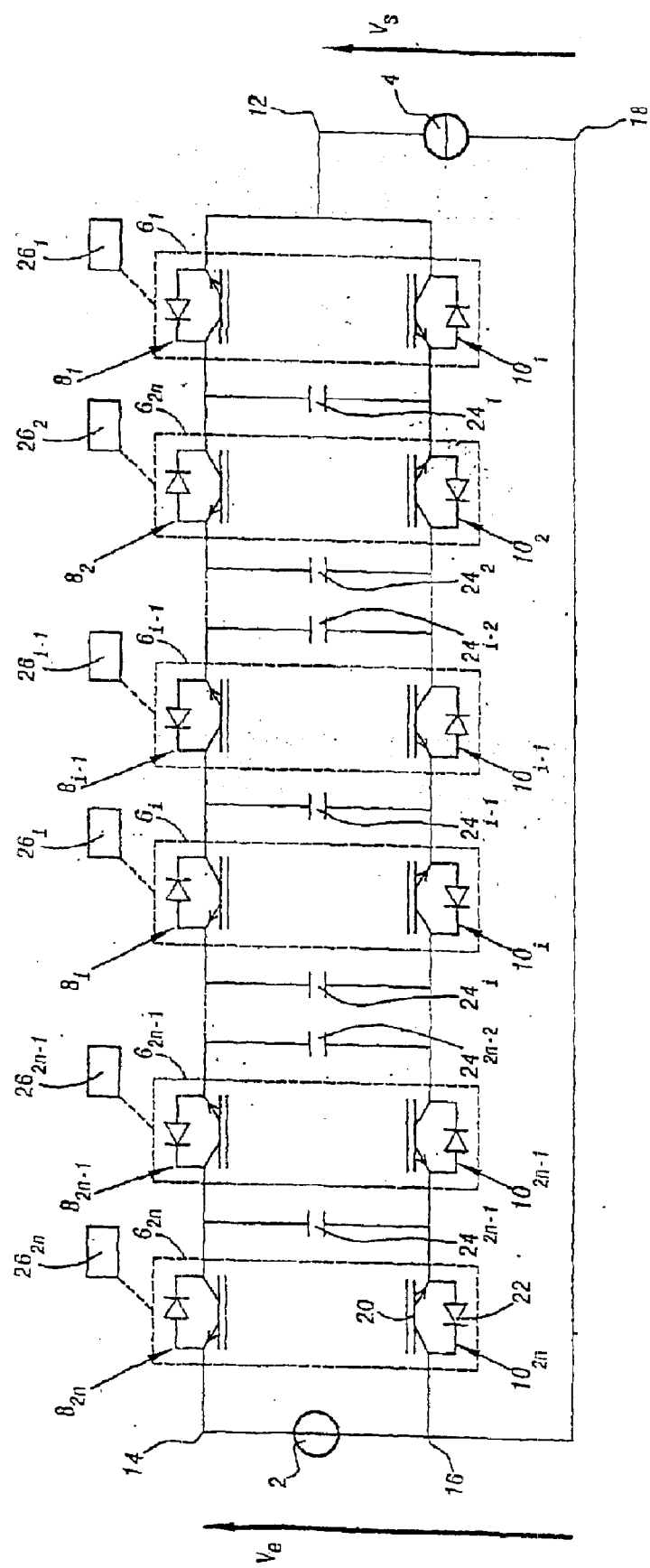
FIG. 1 is a block diagram of a device for reversibly converting electrical power according to the invention.

The cutting device for reversibly converting electrical power represented in FIG. 1 comprises an alternating voltage source 2 ensuring a sinusoidal difference in potential of amplitude $V_e$ between its terminals and an alternating current source 4 tolerating a difference in potential of amplitude $V_s$ between its terminals.

The device also comprises 2n switching cells $6_1, \ldots, 6_{2n}$, n being an integer greater than or equal to 1.

Figure 3:
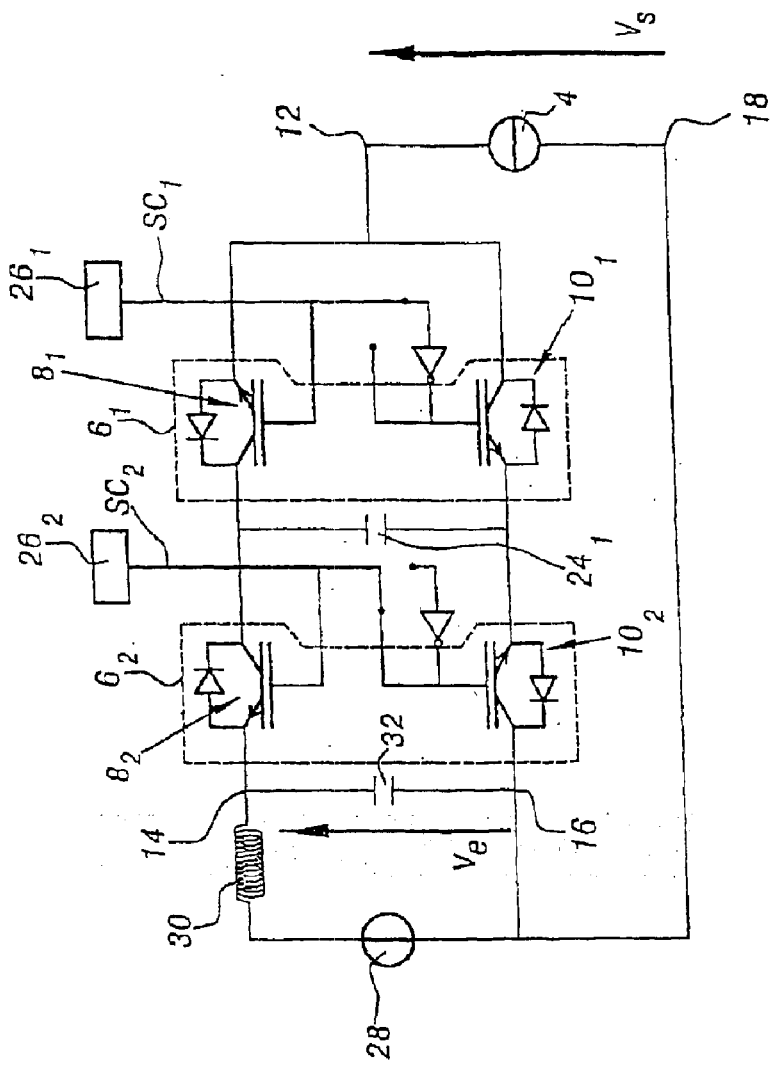
FIG. 3 is a block diagram of a device for reversibly converting electrical power according to the invention, in a case where it comprises two cells, also showing a control unit of this device, during a positive alternation of the voltage of the voltage source.

Each switching cell $6_i$ is constituted by two switches $8_i$ and $10_i$. The control of these switches will be explained in detail when FIGS. 3 and 5 are described.

The 2n switches $8_1, \ldots, 8_{2n}$ constitute a first group of switches and are connected in series in the increasing order of their indices between a first terminal 12 of the current source 4 and a first terminal 14 of the voltage source 2. Likewise, the 2n switches $10_1, \ldots, 10_{2n}$ constitute a second group of switches and are connected in series in the increasing order of their indices between the first terminal 12 of the current source 4 and a second terminal 16 of the voltage source 2.

The second terminal 16 of the voltage source 2 is also connected to a second terminal 18 of the current source 4, thus forming a neutral point of the device, common to the voltage source 2 and to the current source 4.

The switches of the device are all of the same type, that is to say, unidirectional in voltage and bidirectional in current and are constituted by IGBT transistors 20 each associated with an antiparallel diode 22. Each of these IGBT transistors may be replaced, depending on the application, by a bipolar, Darlington, Most, GTO etc. transistor.

2n−1 capacitors $24_1, \ldots, 24_{2n-1}$ are also connected between the 2n cells $6_1, \ldots, 6_{2n}$. Each capacitor $24_i$ is connected, on the one hand, to the point of connection of the two switches $8_i$ and $8_{i+1}$ and, on the other hand, to the point of connection of the two switches $10_i$ and $10_{i+1}$.

Thus, each capacitor $24_i$ maintains at the respective terminals of each cell $6_i$ a voltage having a charge which is zero or equal to a predetermined fraction of the voltage $V_e$ of the voltage source 2, as a function of the state of the switches $8_1, \ldots, 8_{2n}, 10_1, \ldots, 10_{2n}$.

A first half of the cells $6_1, \ldots, 6_{2i-1}, \ldots, 6_{2n-1}$ is arranged in such a manner as to process the positive alternation of the voltage $V_e$ of the voltage source 2. For each cell $6_{2i-1}$ of this first half of the cells, the switch $10_{2i-1}$, which is unidirectional in voltage, is arranged to tolerate or withstand a positive difference in potential between its terminal closest to the current source 4 and its terminal closest to the voltage source 2, and to prevent a difference in potential in the other direction. In a conventional manner, the other switch $8_{2i-1}$ of the cell $6_{2i-1}$ is arranged in the reverse direction.

Likewise, a second half of the cells $6_2, \ldots, 6_{2i}, \ldots, 6_{2n}$ is arranged in such a manner as to process the negative alternation of the voltage $V_e$ of the voltage source 2. For each cell $6_{2i}$ of this second half of the cells, the switch $10_{2i}$, which is unidirectional in voltage, is arranged to tolerate a negative difference in potential between its terminal closest to the current source 4 and its terminal closest to the voltage source 2, and to prevent a difference in potential in the other direction. The other switch $8_{2i}$ of the cell $6_{2i}$ is arranged in the reverse direction.

Finally, the switching cells $6_1, \ldots, 6_n$, are each controlled by control devices $26_1, \ldots, 26_{2n}$ which will be explained in detail when FIGS. 3 and 5 are described.

Figure 2:
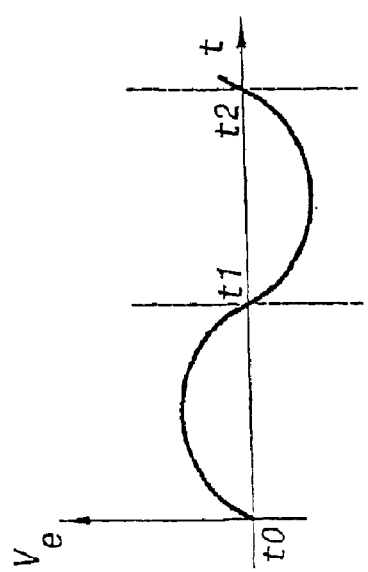
FIG. 2 shows the response curve of the voltage at the terminals of the alternating voltage source of the conversion device shown in FIG. 1.

FIG. 2 shows the response curve of the voltage $V_e$ at the terminals of the voltage source 2 over the course of time, during the functioning of the device described above.

This voltage $V_e$ is alternating and, for example, sinusoidal. In the course of any period it comprises a positive alternation during a first half-period of that period, between an instant $t_0$ and an instant $t_1$, and a negative alternation during a second half-period of that period, between an instant $t_1$, and an instant $t_2$.

A particular form of the device described above is represented in FIG. 3.

In this Figure, the device comprises two switching cells $6_1$ and $6_2$ and two devices $26_1$ and $26_2$ for controlling those switching cells. It is here represented during the positive alternation of the voltage $V_e$ of the voltage source 2.

During this alternation, the control device $26_1$ controls the switching of the two switches $8_1$ and $10_1$, ensuring that they are in opposite states, while the control device $26_2$ controls the cell $6_2$, keeping the two switches $8_2$ and $10_2$ conductive. For that purpose, the devices $26_1$ and $26_2$ transmit, respectively, control signals $SC_1$ and $SC_2$ to the switching cells $6_1$ and $6_2$.

In addition, the alternating voltage source 2 is here formed in a conventional manner by the mounting in parallel of a real voltage source 28 associated in series with an inductance 30, on the one hand, and a capacitor 32, on the other hand. The two terminals of the capacitor 32 constitute the two terminals 14 and 16 of the voltage source 2 described above.

The functioning of the device represented in FIG. 3, during the positive alternation of the voltage source 2, will now be described by means of FIG. 4.

In this Figure, the voltage $V_e$ between the two terminals 16 and 14 of the voltage source 2 is represented between the instants $t_0$ and $t_1$, that is to say, during positive alternation.

This Figure also shows the control signals $SC_1$, and $SC_2$ provided at the output of the two control devices $26_1$ and $26_2$. The value of those signals is at each instant equal to 0 or to 1.

Any switch of the conversion device is kept conductive when it receives a control signal equal to 1 and is kept blocked when it receives a control signal equal to 0.

Thus, between the instants $t_0$ and $t_1$, the signal $SC_2$ is equal to 1 and controls directly the two switches $8_2$ and $10_2$, keeping them conductive, so that the voltage at the terminals of the capacitor $24_1$ is at each instant equal to $V_e$.

During that time, the signal $SC_1$ is a periodic signal of rectangular wave form, the period of which is distinctly shorter than the duration $t_1-t_0$. The switch $8_1$ is directly controlled by that signal while the switch $10_1$ is controlled by the signal $\overline{SC_1}$, one's complement of the signal $SC_1$. Thus, during positive alternation, the voltage $V_e$ of the voltage source is tolerated alternately by the switch $10_1$ when that switch $10_1$ is blocked and by the switch $8_1$ when the switch $10_1$ is conductive.

Figure 4:
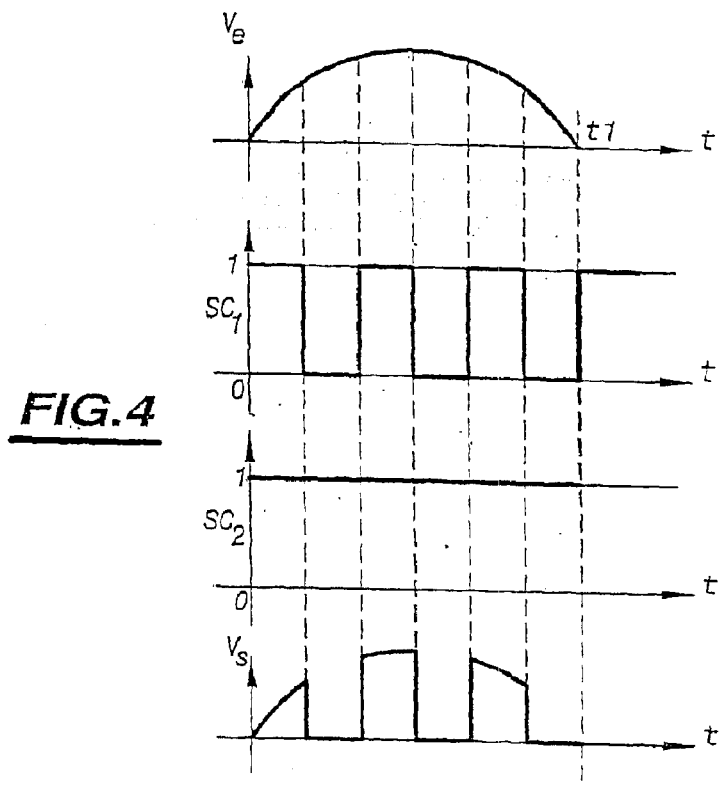
FIG. 4 shows the response curve of the voltage at the terminals of the alternating voltage source, of the control signals of the unit for controlling the switching cells and of the output voltage at the terminals of the alternating current source, for the device shown in FIG. 3.

The resulting output voltage at the terminals 18 and 12 of the alternating current source 4 is also represented in FIG. 4. This voltage is a chopped alternating voltage, the value of which is either zero or equal to $V_e$, given that this voltage is equal to the sum of the voltages at the terminals of the switches $10_1$ and $10_2$.

The device having two cells, described above during positive alternation, is represented in FIG. 5 during the negative alternation of the voltage $V_e$ of the voltage source 2.

During this alternation, the control device $26_1$ controls the cell $6_1$, keeping the two switches $8_1$ and $10_1$ conductive, while the control device $26_2$ controls the switching of the two switches $8_2$ and $10_2$, ensuring that they are in opposite states.

The functioning of the device represented in FIG. 5, during the negative alternation of the voltage source 2, will now be described by means of FIG. 6.

In this Figure, the voltage $V_e$ is represented between the instants $t_1$ and $t_2$, that is to say, during the negative alternation of the voltage source 2.

This Figure also shows the control signals $SC_1$ and $SC_2$. Between the instants $t_1$ and $t_2$, the signal $SC_1$ is equal to 1 and controls directly the two switches $8_1$ and $10_1$, keeping them conductive, so that the voltage at the terminals of the capacitor $24_1$ is zero.

During that time, the signal $SC_2$ is a periodic signal of rectangular wave form, the period of which is distinctly shorter than the duration $t_2-t_1$, as above. The switch $8_2$ is directly controlled by this signal while the switch $10_2$ is controlled by the signal $\overline{SC_2}$, one's complement of the signal $SC_2$. Thus, during negative alternation, the voltage $V_e$ of the voltage source is tolerated alternately by the switch $10_2$ when that switch $10_2$ is blocked and by the switch $8_2$ when the switch $10_2$ is conductive.

The resulting output voltage at the terminals 18 and 12 of the alternating current source 4 is also represented in FIG. 6. As before, this voltage is a chopped alternating voltage, the value of which is either zero or equal to $V_e$.

There is therefore obtained, in the course of a period of the voltage of the voltage source 2, a chopped output voltage which is equal at each instant either to 0 or to the voltage of the voltage source 2.

The teaching of the control of the device represented in FIGS. 3 and 5 is used in a similar way to realize a suitable control of the device represented in FIG. 1, by adapting the control devices in such a manner that all of the cells of the first half of the cells, when the voltage of the voltage source is positive, and all of the cells of the second half of the cells, when the voltage of the voltage source is negative, are controlled with substantially equal cyclic ratios and with phase shifts of the control signals $SC_1$ and $SC_2$ substantially equal to $2\sigma/n$ between two successive cells of a same half of the cells.

According to a further aspect of the invention, the three-phase cutting device for reversibly converting electrical power between a multiplicity of voltage sources and a multiplicity of current sources, which device is represented in FIG. 7, is obtained by the interconnection of three devices such as those described above, for example, three devices each comprising two switching cells. These three devices are interconnected by connecting the three respective neutral points of the devices. A neutral point of the polyphase device is thus formed and is common to all of the voltage and current sources.

It will be appreciated that a monophase or polyphase cutting device for reversibly converting electrical power according to the invention preserves the functionality of cutting the output voltage $V_s$ of the conventional device, while at the same time enabling a user to connect freely one of the terminals of each current source 4 of the device at a predetermined level of potential. In a particular case, this predetermined level of potential may be common to that of one of the two terminals of each voltage source 2.

It will also be noted that the invention is not limited to the embodiment described.

Thus, by way of variation, the switching cells $6_1, \ldots, 6_{2n}$ are not connected in alternation between the cells belonging to the first half of the cells and the cells belonging to the second half of the cells, as described above. For example, the cells belonging to the first half are the cells $6_1$ to $6_n$ and the cells belonging to the second half are the cells $6_{n+1}$ to $6_{2n}$.

Also by way of variation, the interconnection of the three conversion devices in order to form the three-phase cutting device for reversibly converting electrical power, which device is represented in FIG. 7, is effected by interconnecting, on the one hand, the three current sources and, on the other hand, the three voltage sources. These interconnections may each be effected in accordance with a configuration of the "triangle" or "star" type, as desired, these configurations being regarded as conventional.

What is claimed is:

1. Cutting device for reversibly converting electrical power between an alternating voltage source and an alternating current source, comprising an even number of switching cells each having a first and a second switch which are unidirectional in voltage and bidirectional in current, capacitors associated with the switching cells and suitable for maintaining at the terminals of the cells a voltage having a charge which is zero or equal to a predetermined fraction of the voltage of the voltage source, and control devices each connected to a switching cell and suitable for controlling the switching of the first and second switches of the cell, a first half of the cells being suitable for processing the positive alternation of the voltage of the voltage source and the second half of the cells being suitable for processing the negative alternation of the voltage of the voltage source, wherein a first group of switches is formed by the first switches of the switching cells, which first switches are connected in series between a first terminal of the voltage source and a first terminal of the current source, in that a second group of switches is formed by the second switches of the switching cells, which second switches are connected in series between a second terminal of the voltage source and the first terminal of the current source, the unidirectional characteristics in voltage of the first and second switches belonging to the first half of the cells being respectively opposed to those of the first and second switches belonging to the second half of the cells.

2. Cutting device for reversibly converting electrical power according to claim 1, wherein a second terminal of the current source is connected to either of the first and second terminals of the voltage source, thus forming a neutral point of the device common to the voltage source and to the current source.

3. Cutting device for reversibly converting electrical power according to claim 2, wherein the switches of each group belonging to the first half of the cells are connected in alternation with the switches of each respective group belonging to the second half of the cells.

4. Cutting device for reversibly converting electrical power according to claim 1, wherein the switches of each group belonging to the first half of the cells are connected in alternation with the switches of each respective group belonging to the second half of the cells.

5. Cutting device for reversibly converting electrical power according to claim 1, wherein the control devices are suitable for controlling the switching of the two switches of each cell of the first half of the cells, ensuring that they are in opposite states, and for keeping conductive the two switches of each cell of the second half of the cells when the voltage of the voltage source is positive, and conversely, for controlling the switching of the two switches of each cell of the second half of the cells, ensuring that they are in opposite states, and for keeping conductive the two switches of each cell of the first half of the cells when the voltage of the voltage source is negative.

6. Cutting device for reversibly converting electrical power according to claim 5, wherein all the cells of the first half of the cells, when the voltage of the voltage source is positive, and all the cells of the second half of the cells, when the voltage of the voltage source is negative, are controlled with substantially equal cyclic ratios and substantially equal phase shifts between two successive cells of a same half of the cells.

7. Cutting device for reversibly converting polyphase electrical power between a multiplicity of voltage sources and a multiplicity of current sources, said device comprising a multiplicity of devices according to claim 1, the voltage sources and current sources of which are respectively connected to one another.

8. Cutting device for reversibly converting polyphase electrical power according to claim 7, wherein the second terminals of all the current sources are connected to one another, thus forming a neutral point of the current sources, and in that one of the terminals of each voltage source is connected to the same point, thus forming a neutral point of the voltage sources.

9. Cutting device for reversibly converting polyphase electrical power according to claim 7, wherein the neutral point of the current sources and the neutral point of the voltage sources are connected to one another, thus forming a neutral point of the device common to all of the voltage and current sources.

* * * * *